United States Patent [19]

Mehra et al.

[11] 4,211,346

[45] Jul. 8, 1980

[54] VARIABLE VOLUME DISPENSING BOTTLE WITH PUSH-PULL CLOSURE

[75] Inventors: Ravinder C. Mehra; James T. Hepinstall, Jr., both of Fairport, N.Y.

[73] Assignee: Sybron Corporation, Rochester, N.Y.

[21] Appl. No.: 1,896

[22] Filed: Jan. 8, 1979

[51] Int. Cl.[2] .......................... B67D 5/06; B65D 37/00
[52] U.S. Cl. ................................. 222/205; 222/207; 222/211; 222/522
[58] Field of Search ............ 222/205, 207, 211, 424.5, 222/425, 212, 499, 522, 525, 531, 469, 501, 546, 552, 554, 563, 465; 215/355–357; 4/204, 295; 150/8

[56] References Cited

U.S. PATENT DOCUMENTS

| | | |
|---|---|---|
| 1,423,464 | 7/1922 | Shaw ........................... 215/356 |
| 1,581,072 | 4/1926 | Lumsden ........................ 150/8 |
| 2,775,369 | 12/1956 | Waite ........................... 222/522 |
| 3,173,579 | 3/1965 | Curie et al. ..................... 150/8 |
| 3,307,752 | 3/1967 | Anderson ..................... 215/100 A |
| 3,705,668 | 12/1972 | Schwartzman ................. 222/207 |

*Primary Examiner*—H. Grant Skaggs
*Attorney, Agent, or Firm*—Theodore B. Roessel; Roger Aceto

[57] ABSTRACT

A variable volume dispenser of the type wherein squeezing a manually deformable bottle forces liquid from the bottle up through a dispenser tube and into a measuring chamber. An axially movable closure, captured within the outlet end of the dispenser tube is pushed or pulled to snap open or snap close the outlet end.

5 Claims, 4 Drawing Figures

VARIABLE VOLUME DISPENSING BOTTLE WITH PUSH-PULL CLOSURE

BACKGROUND OF THE INVENTION

The present invention relates to variable volume dispensers and more particularly to such a dispenser having a dispenser tube through which the contents are expressed and a plug or closure member for the outlet end of the dispenser tube.

There are several types of variable volume dispensers known in the art. The present invention concerns those wherein the reservoir or body portion is deformable and has a dispenser tube extending up through the top of the bottle with a measuring chamber carried about the outlet end of the tube. In such a bottle, the deformable body portion is manually squeezed while holding the bottle in an upright position. This forces liquid up through the dispenser tube and into the measuring chamber. When the bottle is released any liquid above the level of the dispenser tube outlet is sucked back into the bottle. The bottle is then tipped to pour out the contents of the measuring chamber. With such an arrangement, the volume of liquid dispensed is reproducable. Also in such bottles of the prior art, the measuring chamber can be moved axially with respect to the dispenser tube to adjust the volume of liquid to be measured and dispensed.

One of the drawbacks of currently available variable volume dispensers of the type described is that they are not air tight. The open dispenser tube not only allows air, dust, and other contaminants to enter the bottle, but also allows volatile components within the bottle to escape. In a laboratory situation, dust covers can be placed over the unit to prevent the entry of contaminants into the bottle and to retard evaporation. However, such dust covers are not useful when the dispenser bottle is used in the field and will not prevent spilling or accidental discharge of the liquids as the bottle is being transported.

SUMMARY OF THE INVENTION

In the present invention, a variable volume dispenser bottle of the type described is provided with an axially movable stopper in the outlet end of the dispenser tube. The stopper, has an axial bore terminating in a radially opening port, the stopper being moved axially between an open and a closed position while remaining captured in the outlet end of the dispenser tube. In the closed position, the port in the stopper is sealed within the outlet end of the dispenser tube. In the open position, the stopper is pulled part way out of the dispenser tube to expose the port so that fluid can be expressed from the dispenser tube.

DESCRIPTION OF THE PREFERRED EMBODIMENTS

Figure 1:
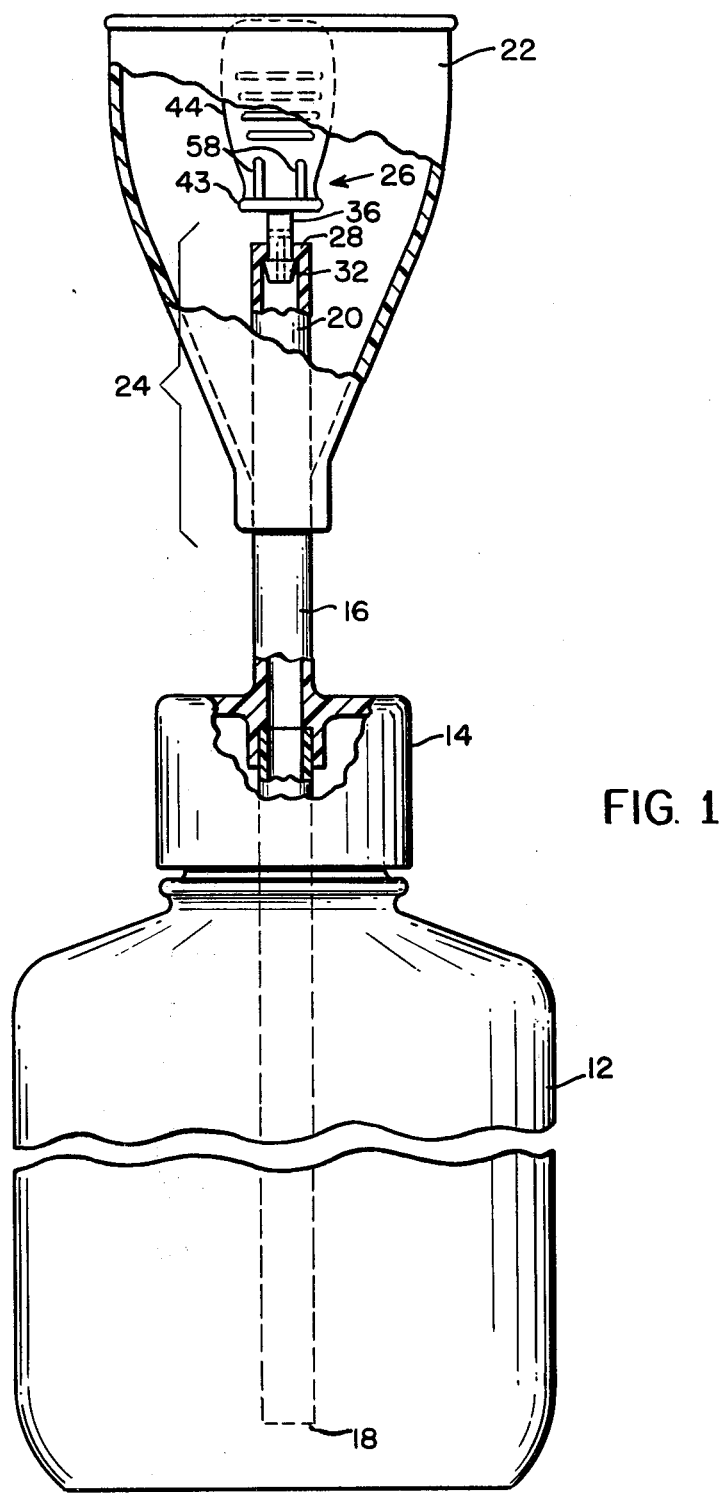
FIG. 1 is an elevation view of a variable volume dispenser bottle employing the stopper of the present invention.

Referring to the drawings, FIG. 1 shows the variable volume dispenser of the present invention generally indicated at 10. The dispenser includes a bottle 12 having a flexible, manually deformable side wall. The filling inlet (not shown) of bottle 12 is closed by a screw cap 14. Extending through and fixed to cap 14 is a dispenser tube 16, which has an inlet 18 disposed just above the bottom of the bottle and an outlet end 20.

Carried by dispenser tube 16 above cap 14 is a measuring chamber 22. This measuring chamber is slidable along tube 16 for purposes set out hereinbelow.

A portion, 24, of dispenser tube 16 including outlet end 20 extends up into the measuring chamber. This dispenser tube portion 24 functions as a standpipe wherein liquid forced up through the dispenser tube by squeezing bottle 12 collects in chamber 22 about the standpipe portion 24. The liquid collected in measuring chamber 22 can then be poured from the measuring chamber simply by tipping the bottle.

It should be appreciated that the volume of liquid in chamber 22 about the standpipe portion is reproducible. In this respect, if bottle 12 is squeezed so as to fill chamber 22 above the level of outlet end 20, releasing the pressure will draw the excess liquid 20 back into the bottle through the dispenser tube so as to lower the level to the level of outlet end 20. With this arrangement, then, the volume of liquid dispensed is reproducible and this volume may be adjusted simply by moving chamber 22 axially along the dispenser tube to increase or decrease the length of standpipe portion 24.

Figure 2:
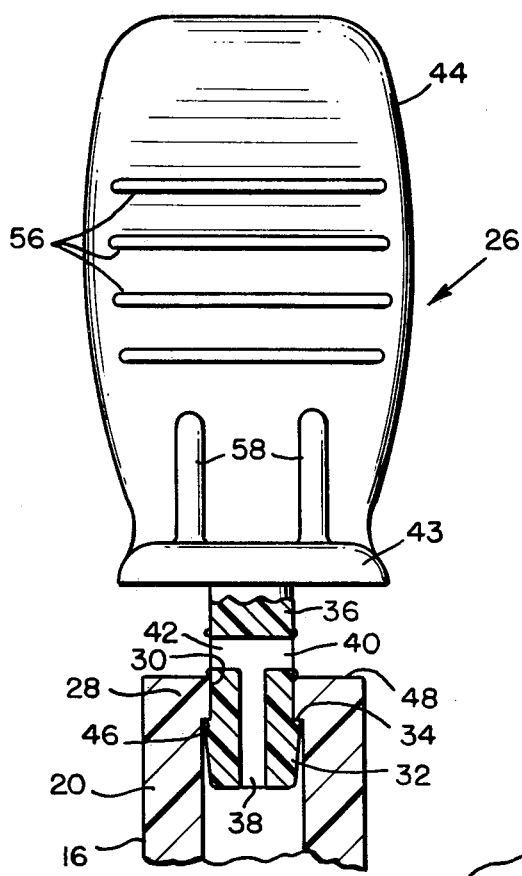
FIG. 2 is view on an enlarged scale, partly broken away and in section, showing the stopper in an open position.

Across the outlet end 20 of the dispenser tube, is an end wall 28, the end wall being integral the dispensing tube and provided with an axial passage 30 (FIG. 2). A stopper 26, used to seal the discharge tube, is captured within outlet end 20 by an engaging cooperation between end wall 28 and portions of the stopper as set out hereinbelow.

As shown in FIG. 2, stopper 26 includes a tapered plug portion 32 disposed within the dispenser tube 16. The upper, and larger diameter, end 34 of the plug provides a sliding, fluid tight fit with the inside diameter of the dispenser tube. The tapered design of plug 32 together with the normal resiliency of tube 16 allows the plug to be pushed into the end of the tube for assembly of stopper 26 to the tube. A stem 36 extends upward from the large end of tapered plug 32 and through passage 30. The outside diameter of stem 36 and the diameter of passage 30 in the end wall are such that there is a sliding, liquid tight seal therebetween.

Extending vertically through plug 32 and a portion of stem 36 is an axial bore 38. The bore communicates with a pair of outlet ports 40, 42 extending radially outward from stem 36. The bore 38 and ports 40, 42 together provide a passage for liquid to pass from the dispenser tube and into measuring chamber 22.

On the upper end of stem 36 is a horizontal flange 43 and an upstanding gripping portion 44. The gripping portion is used to move stopper 26 between an open and closed position while flange 43 provides a guard to prevent gripping the stopper adjacent ports 40, 42. When stopper 26 is moved to the open position as shown in FIG. 2, plug 32 engages against the lower surface 46 of end wall 28. This engagement acts to prevent separating or removing stopper 26 from the outlet end 20 while allowing sufficient axial movement of the stopper so as to uncover ports 40, 42. Thus, with stopper 26 moved to the position shown in FIG. 2, liquid from within the bottle portion 12 can be forced up through bore 38 and outlet ports 40, 42 into measuring chamber 22. However, when the bottle is not in use or is being transported, stopper 26 can be pushed axially inward to the position shown in FIG. 3.

Figure 3:
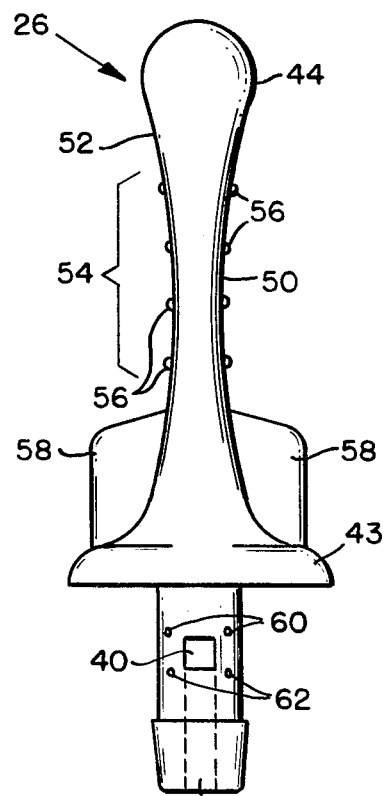
FIG. 3 is a view similar to FIG. 2 showing the stopper in a closed position.

When stopper 26 has been moved or pushed to the position shown in FIG. 3, flange 43 engages against the upper surface 48 of end wall 28. This engagement positions ports 40, 42 within the discharge tube. As set out hereinabove, there is a sliding, fluid tight engagement between stem 36 and end wall 28. Accordingly, when ports 40, 42 are moved to the position shown in FIG. 3, they are sealed by the wall surface of end wall 28 which defines passage 30. This effectively seals the outlet end 20 to prevent discharge of liquid or evaporation from the bottle and the entry of contaminants into the bottle.

The close fitting relationship between the outside diameter of stem 36 and the diameter of passage 30 together with the tapered configuration of plug 32 provides sufficient friction between the stopper 26 and dispenser tube 16 so that the operation of stopper 26 is to snap open or close. The snap action acts to hold the stopper in either of its full open or full closed position and prevents the stopper from moving to a partly open position.

Figure 4:
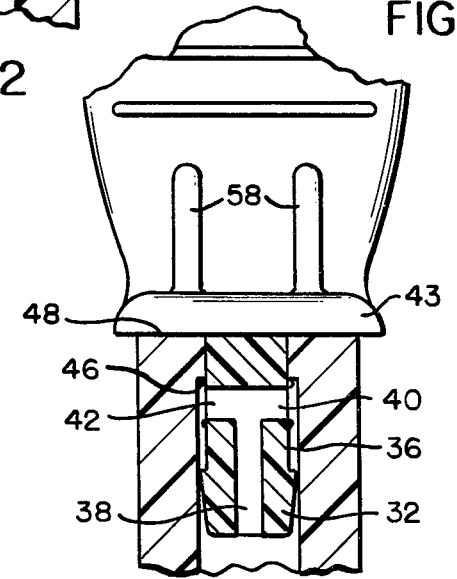
FIG. 4 is a side elevation view of the stopper.

Another feature of the invention is best illustrated in FIG. 4. In this respect, the gripping portion 44 of the stopper has a slim profile with sides 50 and 52 being generally concave so that the middle section 54 is of the gripping portion is thinner than the ends. This shape provides a convenient shape for gripping between the thumb and index finger of the operator to pull or push the stopper. Transverse ridges 56 are provided on each side 50 and 52 to facilitate gripping and pulling or pushing the stopper.

Upstanding from flange 43 at each side of gripping portion 44 are ribs 58. These ribs are about as wide as flange 43 and extend up to a point below the middle section 54. The purpose of these ribs is to make it inconvenient for a person to grip the stopper near flange 43. This keeps the persons hand some distance away from ports 40, 42 to decrease the chance of the operator's hand being contacted with liquid being expressed from the bottle.

For example, the normal procedure would be to hold the bottle 12 in one hand while pulling stopper 26 open with the other. A firm hold on the bottle will squeeze the bottle walls which may result in a spurting discharge of liquid from ports 40, 42 immediately when the stopper is pulled to the open position. Since ribs 58 keep the persons thumb and index finger away from flange 43, there is less likelihood of injury in the event the liquid is harmful, such as caustic or acid.

Located on stem 36 above and below ports 40, 42 are small projections 60 and 62. The snap action of the stopper as described hereinabove, is intensified by these projections. In this respect, these projections 60, 62 interfere with end wall 28 as stem slides through passage 30 so that a forceful push or pull is required to move the stopper to the open or closed position. The projections also act as latches to hold the stopper at either position.

Thus, it should be appreciated that the invention provides a simple stopper arrangement for a variable volume dispenser of the type described which effectively seals the discharge tube when the bottle is not in use or is being transported. The stopper is simply constructed yet provides an efficient sealing mechanism which is opened or closed in a snap operation. Further, the plug portion within the discharge tube and the gripping portion outside of the dispenser tube cooperate to capture the stopper to the dispenser tube so that the stopper cannot be removed or lost.

Having thus described the invention as new, what is claimed is:

1. In a variable volume dispenser of the type having a hand deformable bottle portion, a dispenser tube having an inlet end extending into the bottle and an outlet end outside of the bottle so that squeezing the bottle portion forces liquid up through said tube and out the outlet end and into a measuring chamber disposed about said outlet end, the improvement comprising a closure means for the outlet end of the dispenser tube, said closure means comprising:
    (a) an axially movable first portion disposed within said discharge tube;
    (b) a second portion disposed outside of said dispenser tube said second portion having opposite side walls which are generally concave to provide a thin profile suitable for gripping between thumb and finger;
    (c) a stem extending through said outlet end and connecting said first and second portions, said stem being in sliding fluid tight engagement with said outlet end;
    (d) said first portion and stem having an axial bore communicating with a port opening in said stem;
    (e) a guard member between said stem and second portion to prevent gripping said closure means adjacent said port, said guard member being in the form of
        (i) a horizontal flange between said stem and second portion; and
        (ii) ribs upstanding from said flange and attached to each of said opposite side walls;
    (f) said closure means being axially movable with respect to said discharge tube between a closed position wherein said port is sealed within the outlet end and an open position wherein said port is outside of said outlet end so that liquid can be discharged from said tube and into said measuring chamber through the axial bore and port in said stem; and
    (g) said first and second portions cooperating with said outlet end of said discharge tube to maintain said closure means captured to said discharge tube as said closure means moves between said open and closed positions.

2. A variable volume dispenser as in claim 1 including an end wall formed integral said discharge tube at said outlet end, said end wall having an opening to accommodate the sliding, fluid tight, passage therethrough of said stem wherein said first portion engages said end wall when said closure means is at said open position to prevent removal of said closure means from said discharge tube.

3. A variable volume dispenser as in claim 2 wherein the axial distance between said port and said second portion is such that said port is located within said dispenser tube and below said end wall when said closure means is in said closed position with said second portion engaged against said end wall.

4. A variable volume dispenser as in claim 1 including at least two projections on said stem, one above and one below said port, said projections sufficiently interfering with the movement of said stem through said discharge tube outlet end to require a forceful snap opening or snap closing of said closure.

5. A variable volume dispenser bottle and integral closure comprising in combination:
(a) a hand deformable bottle which is compressed to express a liquid from the bottle;
(b) a dispenser tube having an inlet end disposed adjacent the bottom of said bottle and an outlet end extending outside of said bottle;
(c) a measuring chamber carried by and upstanding from said dispenser tube adjacent said outlet end, said dispenser tube providing the sole communication between the interior of said bottle and said measuring chamber wherein squeezing said deformable bottle forces liquid from said bottle through said dispenser tube and into said measuring chamber;
(d) closure means for said outlet end including a first portion within said dispenser tube, a second portion outside of said dispenser tube and a stem connecting said portions, said closure means being axially movable with respect to said dispenser tube between an open and a closed position;
(e) said first and second portions cooperating with said outlet end to maintain said closure means captured to said dispenser tube as said means is moved axially between said open and closed positions;
(f) said stem being in sliding, fluid tight engagement with said outlet end and having an axial bore therein, said bore communicating at one end with the interior of said discharge tube and at its other end with a port which opens outwardly through said stem to said measuring chamber, said port being positioned on said stem so as to locate said port within said dispenser tube when said closure means is at said closed position and to locate said port outside of said dispenser tube when said closure means is at said open position;
(g) said second portion having a thin profile so it may be conveniently gripped between the thumb and index finger for moving said closure means between said open and closed position; and
(h) a horizontal flange between said stem and said second portion and ribs upstanding from said flange and extending outward from said second portion, said ribs extending generally up to about the middle of said second portion to prevent gripping said second portion adjacent said flange.

* * * * *